United States Patent [19]
Kopp et al.

[11] Patent Number: 5,318,417
[45] Date of Patent: Jun. 7, 1994

[54] EXTRUSION HEAD FOR FORMING POLYMERIC HOLLOW FIBER

[76] Inventors: Clinton V. Kopp, 53 Tuckwell Road, Castle Hill, New South Wales; Robert J. W. Streeton, 33 Drummond Street, Windsor, New South Wales; Paul S. Khoo, 26 Christine Street, Northmead, New South Wales, all of Australia

[21] Appl. No.: 536,650
[22] PCT Filed: Nov. 10, 1989
[86] PCT No.: PCT/AU89/00480
  § 371 Date: Jul. 9, 1990
  § 102(e) Date: Jul. 9, 1990
[87] PCT Pub. No.: WO90/05006
  PCT Pub. Date: May 17, 1990

[30] Foreign Application Priority Data
Nov. 10, 1988 [AU] Australia .............. PJ 1395

[51] Int. Cl.⁵ .............................. A01J 21/00
[52] U.S. Cl. ........................ 425/97; 425/90; 425/131.1; 425/131.5; 425/463
[58] Field of Search .......... 425/90, 97, 131.1, 131.5, 425/463

[56] References Cited

U.S. PATENT DOCUMENTS

| | | |
|---|---|---|
| 3,017,238 | 1/1962 | Levine . |
| 3,378,507 | 4/1968 | Sargent et al. . |
| 3,423,491 | 1/1969 | McLain et al. . |
| 4,020,230 | 4/1977 | Mahoney et al. . |
| 4,110,153 | 8/1978 | Rechlicz et al. ............ 156/633 |
| 4,115,492 | 9/1978 | Mahoney et al. . |
| 4,247,498 | 1/1981 | Castro . |
| 4,248,924 | 2/1981 | Okita .................... 428/212 |
| 4,401,567 | 8/1983 | Shindo et al. ............ 210/500.2 |
| 4,444,716 | 4/1984 | Aoyagi et al. . |
| 4,519,909 | 5/1985 | Castro . |
| 4,564,488 | 1/1986 | Gerlach et al. . |
| 4,594,207 | 6/1986 | Josefiak et al. . |
| 4,666,607 | 5/1987 | Josefiak et al. . |
| 4,708,799 | 11/1987 | Gerlach et al. . |

FOREIGN PATENT DOCUMENTS

| | | |
|---|---|---|
| 7284081 | 1/1982 | Australia . |
| 601599 | 6/1988 | Australia . |
| 8058487 | 6/1988 | Australia . |
| 108601 | 5/1984 | European Pat. Off. . |
| 180052 | 5/1986 | European Pat. Off. . |
| 217698 | 4/1987 | European Pat. Off. . |
| 3318180 | 8/1987 | Fed. Rep. of Germany . |
| 1452400 | 10/1976 | United Kingdom . |
| 8602282 | 4/1986 | World Int. Prop. O. . |

*Primary Examiner*—James J. Bell
*Attorney, Agent, or Firm*—Waldron & Associates

[57] ABSTRACT

A process for making a polymeric, porous hollow fibre (21) by heating a mixture of a thermoplastic polymer and a solvent to a temperature and for a time for the polymer and solvent to mutually dissolve, then introducing the molten mixture into an extrusion head (FIG. 1) adapted to shape the hollow fibre. The shaped fibre is then cooled in the extrusion head to a temperature so that non-equilibrium liquid-liquid phase separation takes place to form a bi-continuous matrix of the polymer and solvent in which the polymer and solvent form two intermingled separate phases of large interfacial surface area. Finally, the solvent is removed from the polymer.

The extrusion head for forming the abovementioned polymeric, porous hollow fibre has an elongated body (17, 18) defining an axial passageway (11) for receiving a lumen-forming fluid (14) and a first annular passage (12) therearound for receiving the molten mixture (15) from which the hollow fibre (21) is formed. A second annular passageway (13) is radially outward of the first annular passageway (12) and receives a coating fluid (16). A third annular passageway (19) receives a cooling fluid and has means (20) for directing the cooling fluid towards the outer surface of the coating fluid (16). The porous polymeric material of the fibre produced by the abovementioned process has a lacey or filamentous structure consisting of a plurality of polymer strands connected together at spaced apart locations along each strand.

13 Claims, 6 Drawing Sheets

EXTRUSION HEAD FOR FORMING POLYMERIC HOLLOW FIBER

FIELD OF INVENTION

This invention relates to the manufacture of porous hollow fibre membranes and more particularly to an extrusion die assembly for forming such membranes.

BACKGROUND ART

Porous polymeric structures having pores in the range of 0.01 to 10 microns are commonly used for microfiltration. Such membrane structures may be prepared from thermoplastic polymers using precipitation techniques and formed into various shapes including hollow fibres or flat sheets.

The thermal precipitation technique for membrane formation commences with the formation of a solution of a thermoplastic polymer in a solvent at an elevated temperature. The solution is then cooled and, at a specific temperature which depends on the polymer, the solvent, the concentration of the polymer in the solvent and the rate of cooling, phase separation occurs and the liquid polymer separates from the solvent.

True solutions require that there be a solvent and a solute. The solvent constitutes a continuous phase, and the solute is distributed randomly in the solvent at a molecular level. Such a situation is almost unknown with polymer solutions. Long polymer chains tend to bend back on themselves and form temporary interactions or bonds with other polymer chains with which they come into contact. These interactions are continually forming and breaking, and new ones are formed. Polymer solutions are thus rarely true solutions but lie somewhere between true solutions and mixtures.

In many cases it is also difficult to state which is the solvent and which is the solute. In the art, it is accepted practice to call a mixture of polymer and a solvent a solution if it is optically clear without obvious inclusions of either phase in the other. Phase separation is usually then taken to be that point where there is an optically detectable separation.

There is yet another case where the heated mixture of polymer, solvent, and other components if present, if neither a solution nor a mixture in the usual sense of the words. This is the case where a surface-active agent is present in sufficient concentration to form ordered structures such as micelles.

A hollow fibre forming installation disclosed in U.S. Pat. No. 4,708,799 includes a vessel containing a heated solution of a polymer and a liquid which is inert relative to the polymer which is delivered to an extrusion die by a pump. The hollow fibre is extruded through a nozzle into a spinning tube containing inert liquid of the solution. The fibre and the inert liquid pass through an atmospheric gap to a spinning tube in the same direction and at substantially the same linear velocity.

In that installation, the hollow fibre is extruded in the molten state and formed in the spinning tube. The application of the inert liquid to the molten fibre has an adverse effect on the porosity of the surface of the fibre. Furthermore, the use of a spinning tube is cumbersome and costly.

DISCLOSURE OF INVENTION

According to a first aspect of the invention there is provided a process for making a polymeric, porous hollow fibre comprising the steps of:
a) heating a mixture of a thermoplastic polymer and a solvent to a temperature and for a time for the polymer and solvent to mutually dissolve,
b) introducing the molten mixture into an extrusion head adapted to shape the hollow fibre,
c) cooling the shaped fibre in the extrusion head to a temperature so that non-equilibrium liquid-liquid phase separation takes place to form a bicontinuous matrix of the polymer and solvent in which the polymer and solvent form two intermingled separate phases of large interfacial surface area, and,
d) removing the solvent from the polymer.

According to the invention there is also provided an extrusion die assembly for producing a hollow fibre membrane which has a quadruple co-extrusion head having four concentric passageways. The axial passageway receives a lumen forming fluid, the next outward passageway receives a homogenous mixture of the polymer and a surfactant solvent to form the membrane, the next outwardly concentric passageway receives a coating fluid and the outermost passageway receives a cold quench fluid.

Each fluid is transported to the extrusion head by means of individual metering pumps. The four fluids are individually heated and are transported along thermally insulated and heat traced pipes. The extrusion head has a number of temperature zones. The lumen fluid, membrane dope and coating fluid are brought to the same temperature in a closely monitored temperature zone where the polymer solution making up the dope is shaped. The quench fluid is introduced in a cooling zone where the dope undergoes non-equilibrium liquid-liquid phase separation to form a bicontinuous matrix of large interfacial surface area of two liquids in which the polymer phase is solidified before aggregated separation into distinct phases of small interfacial surface area can take place.

The hollow fibre membrane leaves the extrusion head completely formed and there is no need for any further formation treatment except for removing the surfactant solvent from the membrane in a post-extrusion operation that is common to membrane manufacturing processes. A volatile solvent that does not dissolve the polymer is used to remove the surfactant solvent for the polymer from the finished membrane.

The hollow fibre membrane made in accordance with the invention is characterised by a lacey or filamentous structure. In this specification, the term "lacey" means that the membrane is made up of a plurality of polymer strands connected together at a number of locations along each strand. Each connection point has only slightly larger dimensions than the cross-section of the strands. The length of each strand is from 5 to 50 times the diameter of the strand and the strands vary in cross-sectional shape from circular to elliptical, in the latter case the major axis of the ellipse may be up to 5 times the minor axis of the ellipse. The description "lacey or filamentous structure" may also be visualized as a three dimensional rounded lace filet derived from a bicontinuous structure.

A preferred hollow fibre membrane of the invention, has a lacey structure in which there is some slight orientation of the strands in the axial direction of the fibre so that when a lumenal gaseous blowback procedure is implemented to clean the fibres, certain dimensions of the interstices increase on average allowing any material lodged in the interstices to be easily dislodged. The interstices are of a generally axially elongated shape and when the gaseous blowback is applied, the interstices distort from the axially elongated shape into a generally square shape to enlarge the minimum dimension of the interstices. The gaseous blowback will also stretch the fibre to increase the minimum dimension of the interstices.

BRIEF DESCRIPTION OF THE DRAWINGS

In order that the invention may be more readily understood and put into practical effect, reference will now be made to the accompanying drawings in which.

Figure 1:
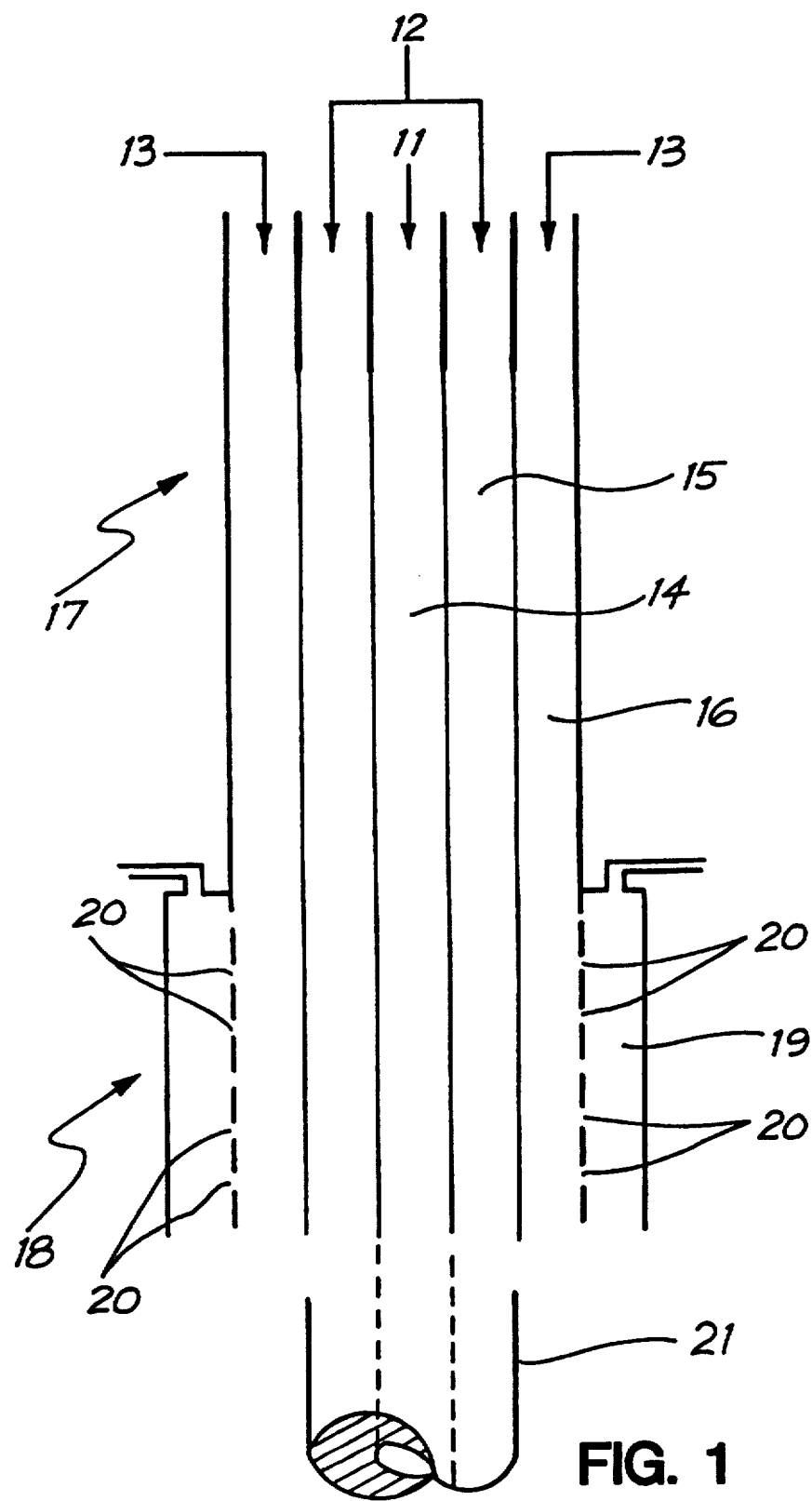
FIG. 1 is a schematic diagram of an extrusion die according to the invention.
Figure 2:
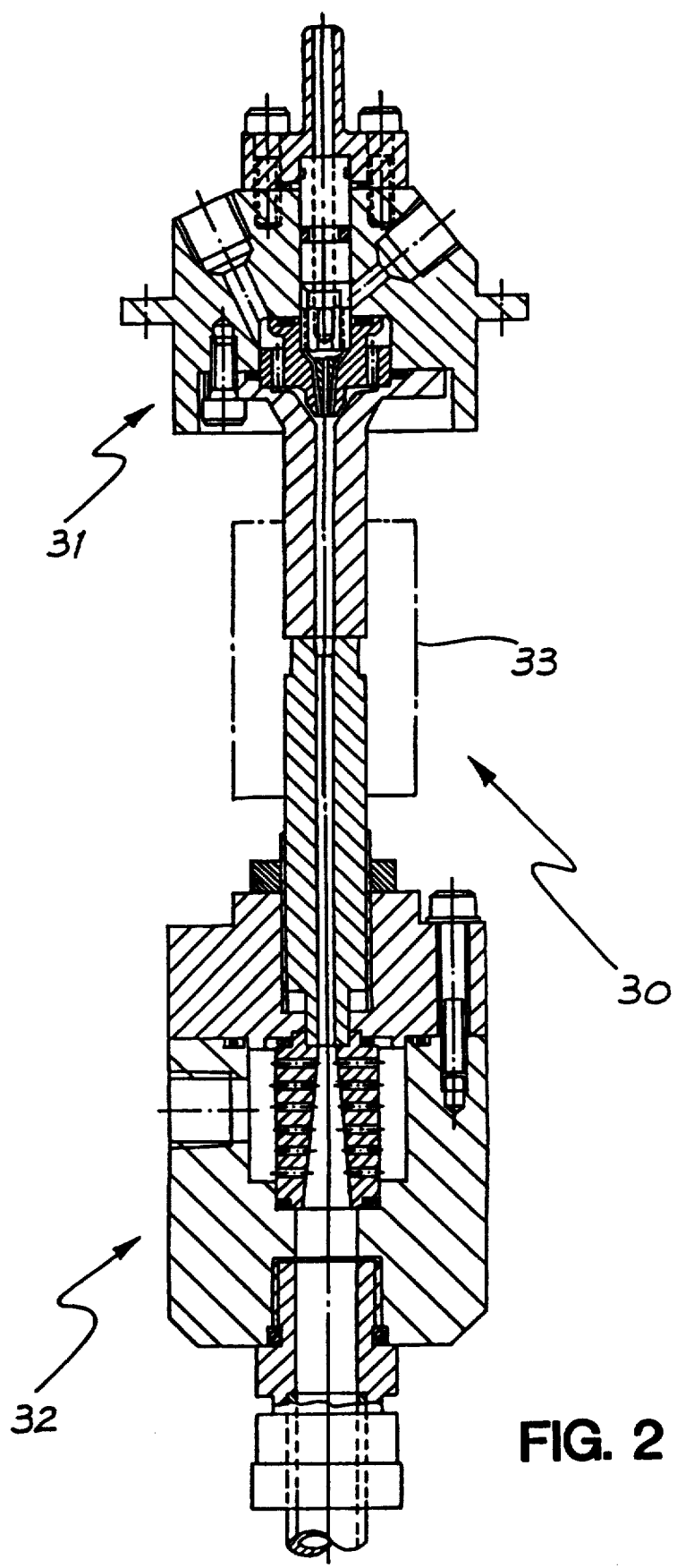
FIG. 2 is a cross-sectional view of an extrusion die assembly according to one embodiment of the invention.

The extrusion die shown in schematic form in FIG. 1 has, at its upper end, three concentric passageways 11, 12 and 13. The axial passageway 11 carries a lumen fluid 14 such as nitrogen gas, the inner annular passageway 12 carries a homogeneous solution (or dope) 15 of polymer material and surfactant and the outer annular passageway 13 carries a hot coating fluid 16 such as soybean oil. Neither the lumen fluid nor the coating fluid contain the surfactant present in the dope passing through passageway 12. The thick lines in FIG. 1 represent walls and the thin lines represent interfaces between the various fluids.

The upper portion 17 of the extrusion head 10 is a closely monitored temperature zone. Within the hot zone 17, the coating material remains as a coating on the membrane 21 being formed and dissolves part of the surface of the membrane 21 to provide a porous surface on the membrane.

Below the hot zone 14 there is a cooling zone 18 which includes an annular quench fluid passageway 19. The quench fluid, which may be cold soybean oil, is pumped through the quench passageway 19 at a fixed rate and the coolant or quench fluid is not open to atmosphere. The inner wall of quench passageway 19 has a series of openings 20 through which the quench fluid passes. Beneath the extrusion head 10 there is a collection point for receiving the extruded membrane 21.

An extrusion die assembly 30 according to one embodiment of the invention is shown in FIGS. 2 to 5 and consists of an upper or melt die portion 31 and a lower or quench tube die portion 32 coupled together by a union 33.

Figure 3:
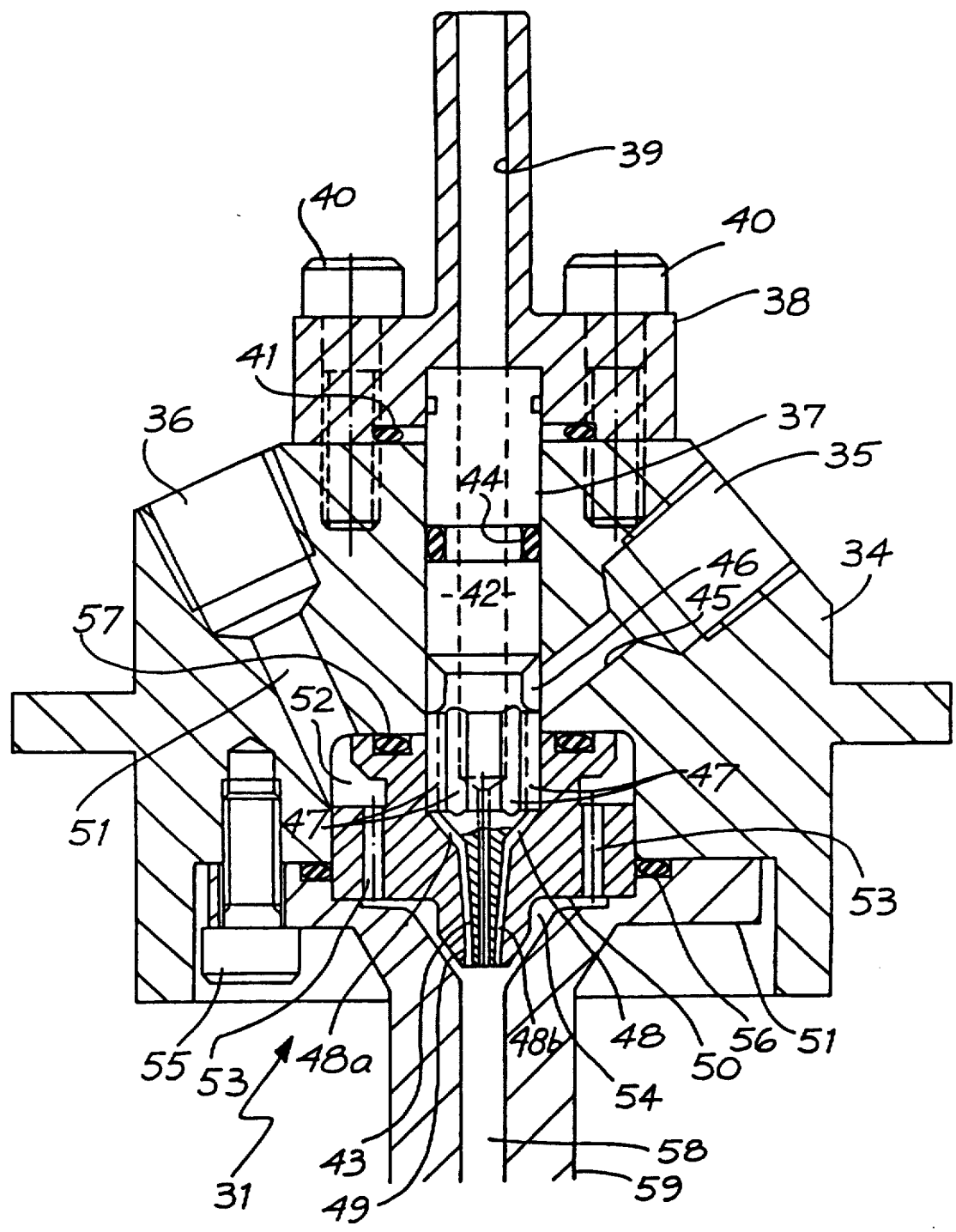
FIG. 3 is an enlarged cross-sectional view of the upper or melt die portion of the extrusion die assembly of FIG. 2, and, FIG. 4 is an enlarged cross-sectional view of the lower or quench tube portion of the extrusion die shown in FIG. 2.

The melt die portion 31 which is shown on an enlarged scale in FIG. 3, has a body 34 having an inlet 35 for receiving membrane forming dope and an inlet 36 for receiving coating fluid. The body has a central bore 37 and at its upper end there is a closure plate 38 having an axial passageway 39 for receiving a lumen forming fluid. The plate 38 is secured to the body 34 by bolts 40 and a seal is provided by "O" ring 41.

Within the central bore 37 of the body 34 there is a nozzle member 42 which depends from the plate 38. The axial passageway 39 is reduced in diameter at its lower end where it passes through the tapered end 43 of nozzle member 42. The nozzle member 42 is sealed in the body 34 by "O" ring 44. The passageway 39 corresponds to passageway 11 of FIG. 1.

The dope inlet 35 leads to a dope delivery passageway 45 in communication with an annular chamber 46 formed in the outer surface of nozzle 42. Dope is discharged from the chamber 46 into passageway 47 which exits into a tapered annular fibre forming tube 48 defined between the outer face of the nozzle 42 and a recess 49 formed in die plate 50.

Figure 5:
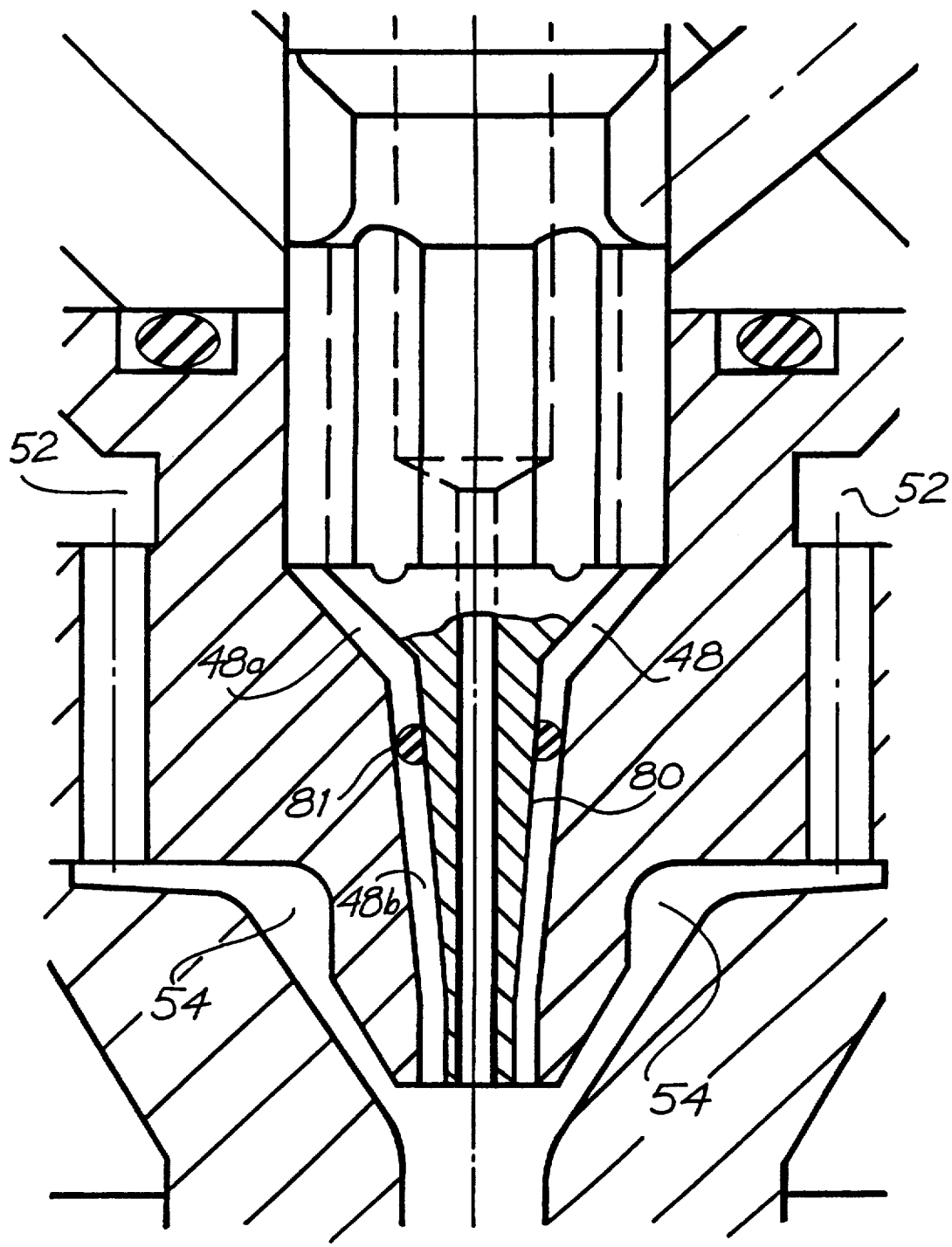
FIG. 5 is an enlarged cross-sectional view of the discharge nozzle of the melt die portion of the extrusion die assembly shown in FIG. 2, and, FIG. 6 is a schematic diagram of an extrusion installation according to one embodiment of the invention.

As can be seen in FIGS. 3 and 5 the fibre forming tube 48 has an upper conical portion 48a and a lower conical portion 48b. The upper portion 48a is inclined at a larger angle to the vertical than the lower portion 48b. In this instance, the angle of inclination of the upper portion is from 30° to 60° from the axis and that of the lower portion is from 1° to 10° from the axis. In the preferred embodiment, the angle from the axis on the upper portion of nozzle 42 is 44° and on the upper portion of the die plate 50 is 50° and on the lower portion of nozzle 42 is 3° and on the lower portion of ringplate 50 is 5°. The tapered tube 48 provides a neck-down ratio (that is the ratio of the molten dope at the bottom of the tube 48 to diameter of the finished fibre) of 2.1 to 1. The neck down ratio may be in the range of 1:4 to 10:1.

The coating fluid inlet 36 leads to a coating fluid delivery passageway 51 in communication with an annular chamber 52 formed by a recess in the bottom of the body 34 and the die plate 50. Coating fluid is discharged from chamber 52 into passageways 53 formed in the die plate 50 which exit into an annular chamber 54 formed between the bottom of the die plate 50 and ring plate 51.

The ring plate 51 is secured to the body 34 by bolt 55. "O" ring 56 provides a seal between the ring plate 51, die plate 50 and body 34 and "O" ring 57 provides a seal between die plate 50 and body 34. A central bore 58 of the stem portion 59 of the ring plate 51 receives the fibre which is retained in hollow form by the lumen fluid and which is coated with the coating fluid.

Figure 4:
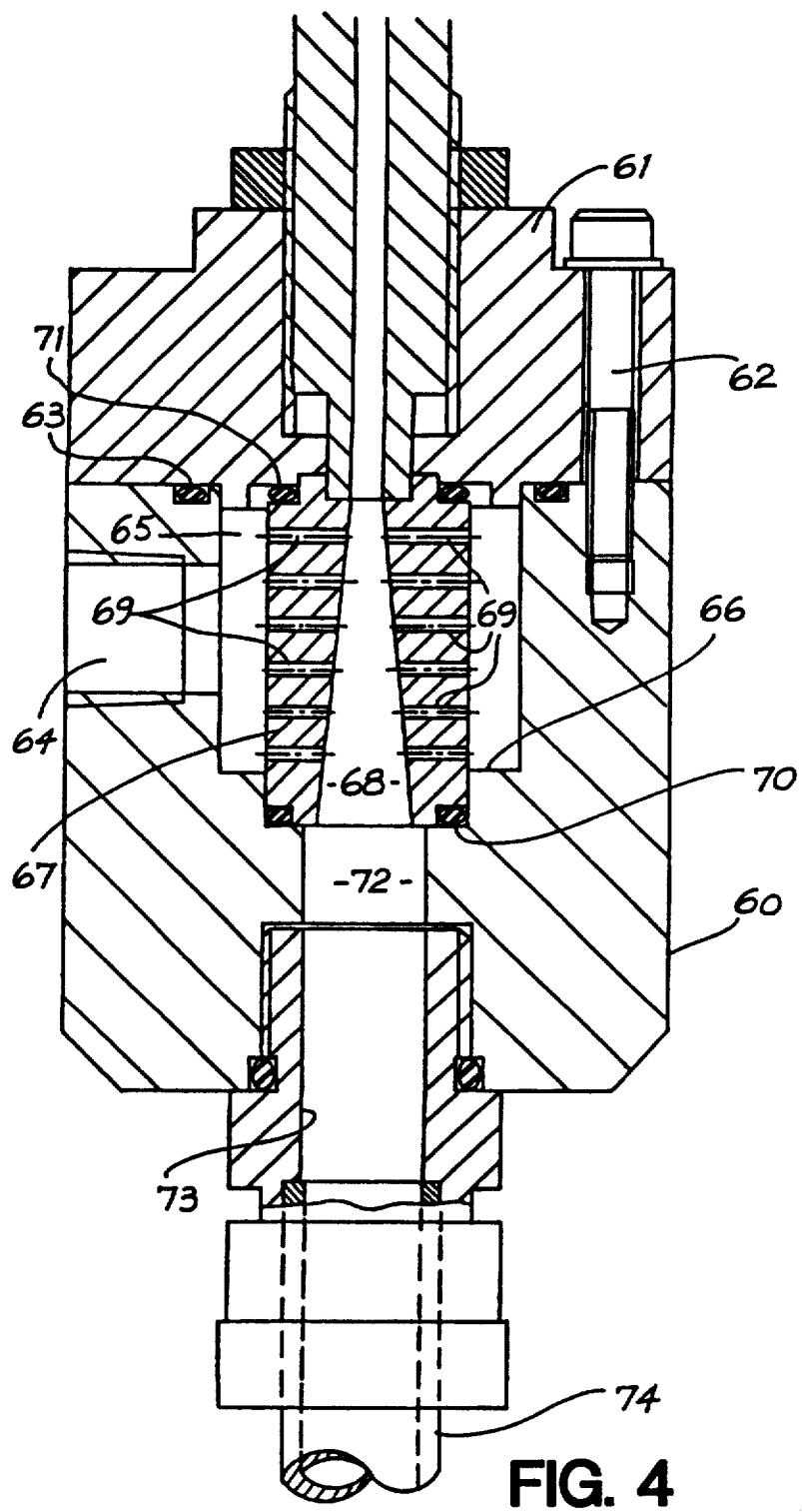

The quench tube portion 32 which is shown on an enlarged scale in FIG. 4 has a body portion 60 and a connector plate 61 secured thereto by bolt 62. "O" ring 63 provides a seal between the body 60 and plate 61. The body 60 as a quench fluid inlet 64 which leads to a quench fluid chamber 65 formed by a recess 66 formed in the body 60.

Within the recess 66 there is a quench oil diffusor 67 having an axial bore 68. Passageways 69 connect the chamber 65 to the bore 68.

"O" ring 70 seals the diffusor 67 with respect to the body 60 and "O" ring 71 seals the diffusion 67 with respect to the connector plate 61. The bore 68 of the diffusor 67 is in communication with the bore 72 of body 60 which in turn is in communication with the bore 73 of discharge tube 74.

FIG. 5 is an enlarged view of the discharge nozzle 42 which, in this instance, is modified to be in the nature of a needle 80 having a plurality of protrusions 81 which act to self centre the needle 80 within the chamber 48.

Figure 6:
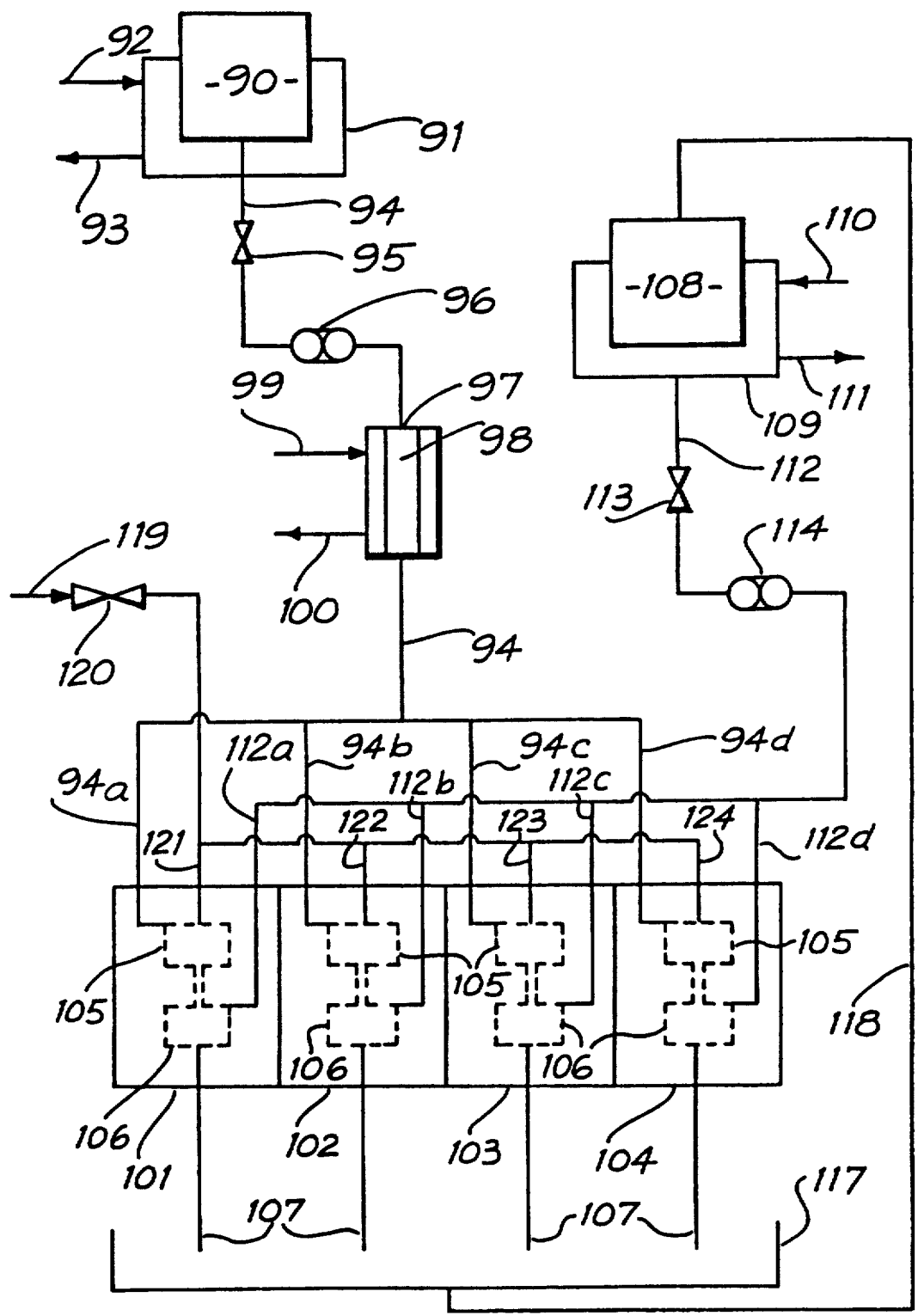

The extrusion line shown in FIG. 6 includes a vessel 90 containing a membrane forming solution or dope. Around the vessel 90 there is a heating jacket 91 coupled to a heating oil system (not shown) by lines 92 and 93. Dope from the vessel 90 is drawn through line 94 and valve 95 by gear pump 96. From the gear pump 96, the dope passes through filter 97 having a heating jacket 98 coupled to the heating oil system by lines 99 and 100.

Downstream of the filter 97, dope line 94 branches into four lines 94a, 94b, 94c and 94d which lead to extrusion die heads 101, 102, 103 and 104 respectively. Each die head has a melt portion 105 of the kind described in relation to FIG. 3 and a quench tube portion 106 of the kind described in relation to FIG. 4. Lines 107 represent the formed hollow fibres which are extruded from the die heads 101, 102, 103 and 104. The hollow fibres are wound onto reels (not shown).

A vessel 108 containing a quench fluid has a heating jacket 109 coupled to the oil heating system by lines 110 and 111. Quench fluid is drawn through line 112 and valve 113 by gear pump 114. Downstream of the pump 114, the line 112 branches into four lines 112a, 112b, 112c and 112d which lead to the respective quench tube portions 106 of the die heads 101, 102, 103 and 104. After passing through the tube portions 106 the quench fluid is collected in reservoir 117 and returned to vessel 108 through line 118.

A lumen forming fluid is introduced through line 119 and valve 120. Downstream of the valve 120, line 119 branches into line 121, 122, 123 and 124 which lead to the respective melt portions 105 of the die heads 101, 102, 103 and 104.

The various pipes of the installation are insulated and all parameters are controlled by a microprocessor.

DESCRIPTION OF PREFERRED EMBODIMENTS

The invention will now be further described with reference to the production of porous hollow fibre membranes.

EXAMPLE 1

A dope was formed by mixing and then heating 2600 gram of polypropylene pellets, 7300 gram of TERIC N2 and 100 gram of anti-oxidant ETHANOX 330 (ETHANOX & TERIC are Registered Trade Marks). TERIC N2 is nonylphenoxyethoxyethanol. The temperature of the dope was raised to above 220° C. with agitation under vacuum to ensure that that the mixture became homogeneous. The dope was then extruded through the quadruple passage die at a temperature of 220° C.

During mixing, the vessel 90 was held under a vacuum of −96 kPa and the oil heating system maintained at 245° C. Mixing was commenced when the temperature of the vessel 90 was 160° C. The mixing and heating time was 240 minutes. During extrusion the lumen forming nitrogen gas was maintained at 200 kPa. The filter 97 had an average pore diameter of 20 micron and the pressure drop across the filter was 50 kPa.

Nitrogen was used as the lumen forming fluid and soybean oil as the coating fluid and quenching fluid. The dope flow rate was 22 cc/min, the lumen pump flow rate 7.6 cc/min, the coating pump flow rate 5.0 cc/min and the quench pump flow rate was 1750 cc/min.

The circularity of the fibre prior to extraction of the solvent was 95% and the break extension was 175%.

After extracting the solvent, the physical characteristics of the fibre were:

| | |
|---|---|
| Lumen | 340 micron |
| Outer diameter | 640 micron |
| Circularity | |
| Concentricity | |
| Bubble point | >170 kpa |
| % pores above 0.16 micron | >50% |
| Mean pore size | 0.20 micron |
| Water Permeability at 50 kPa | >40 cc/min/m |
| Yield force | 0.8 N |
| Break force | 1.0 N |
| Break extension | >150% |
| Surface pore width (nominal) | 1 micron |

The structure of the fibre so formed was generally lacey. The lacey structure does not lend itself to a precise qualitative description in terms used to describe prior art membranes such as cells and pores. In the prior art such as U.S. Pat. No. 4,519,909, cells relate to spheres and pores relate to cylinders. In some respects, the parts of the lacey structure where one cavity intersects another may be equivalent to a "cell" and the actual intersection itself a "pore". Topologically, such "cells" of the lacey structure relate to adjacent spheres and such "pores" relate to circles formed by their intersection whereas in the prior art the cells relate to separated spheres and the pores relate to the connecting cylinders.

As well as such "pores" and "cells", the lacey structure has alveoli which are larger cavities than cells and these connect to a larger number of "cells". The lacey structure occupies the spaces between the alveoli.

A typical lacey structure may have substantially spherical "cells" of between 0.1 to 5 micron which have substantially circular "pores" of 0.1 to 0.5 micron interconnecting the cells to each other. The "pores" also connect the cells to alveoli of about 8 to 20 micron. Water Permeability tests showed that the permeability of a typical fibre from outside to lumen was one third of the permeability from lumen to outside.

Although the example has been described in relation to a polypropylene/TERIC N2 solution, it is to be understood that the extrusion process may be applied to other solutions. Soybean oil with or without castor oil may be added to the solution as a co-solvent and SYNPROLAM 35X2 or BRIJ 92 may be used instead of TERIC N2. SYNPROLAM and BRIJ are Registered Trade Marks. A solvent may be added to the coating fluid.

Surface pore modification may be effected by both temperature control and variation of the composition of the coating fluid. Membranes can be prepared having elongated pores in the axial direction but with symmetrical morphology in the radial and circumferential directions. Surface porosity can be varied in radial porosity from a "skin" through to complete radial isotropy and further to having a surface that is more porous than the remainder of the membrane (reverse asymmetry).

During extrusion, the coating fluid mixes significantly with the molten polymer to a greater extent than the quench fluid mixes when the coating fluid is omitted. The coating fluid controls the surface porosity of the membrane. The hot coating fluid ameliorates the sudden cooling effect of the quench fluid on the dope. The coating fluid is a separate, co-extrusion, and is neither part of the membrane extrusion nor the quench co-extrusion.

Although the precise mechanism of the structure formation is not clear, it would seem that a liquid-liquid bicontinuous system is formed which if maintained for sufficient time would become two separate layers. During this process, the system could be made to pass through a lacey structure followed by a stage of nearly spherical cells with interconnecting pores. For a given polymer and solvent mix, the size range of the cells depends on cooling rate and the interfacial surface tension between the polymer rich and the polymer lean phases while the pore size depends on cooling rate and, to a lesser extent, molecular weight of the polymer.

It is to be noted that the fibre travels down the quench tube at a significantly different linear speed from the quench fluid. The extruded fibre travels at a speed three to four times faster than the average speed of the quench fluid. Such a speed difference calculated on the average speed also means that the fibre travels at a speed about double the maximum speed of the quench fluid. The average and maximum speed of the quench fluid above are taken as the speed with no fibre present.

Although the above example refers to the use of nitrogen as the lumen forming fluid, any saturated vapour may be used as may a wide variety of liquids. When nitrogen (or a saturated vapour) is used, it has the effect of reducing the lumenal surface pore size, giving greater asymmetry. Use of a saturated vapour has the property that it will condense in the lumen under cooling, allowing the quench fluid to pass through the porous walls, and give some measure of mechanical compression to the solidifying membrane.

Although polypropylene is the presently preferred thermoplastic polymer, the following polymers may be used:

(a) polybutylene
(b) polyvinylidene difluoride
(c) polyvinylidene dichloride
(d) polyamide
(e) polyvinyl chloride
(f) polystyrene
(g) polymethylmethacrylate
(h) polyphenylene oxide
(i) polyethylene terephthalate
(j) polyacrylonitrile
(k) cellulose acetate Apart from TERIC N2 another solvent which may be used is SYNPROLAM 35X2 which is an amine ethoxylate of the general formula:

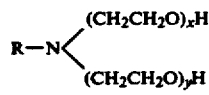

where $x+y=2$ to 50 and R is a mixture of $C_{13}$ and $C_{15}$ fatty radicals in the approximate ratio of 70:30 about half of which are linear and the rest mostly branched species. In the case of SYNPROLAM 35X2, $x+y=2$. Yet another solvent which may be used is BRIJ 92 which is a polyoxyethylene (2) oleyl alcohol. Other solvents which may be used in carrying out the process of the invention include:

(a) ethyloxylated derivatives of cetyl-oleyl alcohol such as TERIC 17A2
(b) condensates of ethylene oxide with tall oil such as TERIC T2
(c) self-emulsifying derivatives from high molecular weight fatty acids such as TERIC124
(d) sorbitan monooleate
(e) sorbitan monostearate
(f) sorbitan sesquioleate
(g) POE hexitan fatty acid ester
(h) POE cetyl oleyl alcohol such as ATLAS G-70140
(i) ATMER 685 nonionic surfactant
(j) POE (2) cetyl alcohol
(k) POE (2) stearyl alcohol
(l) POE fatty alcohols such as CIRRASOL EN-MB and CIRRASOL EN-MP
(m) POE (2) synthetic primary $C_{13}/C_{15}$ alcohol such as RENEX 702

ATLAS, ATMER, CIRRASOL and RENEX are Registered Trade Marks.

The same substance may be used as the coating, lumen, or quench fluids. The lumen forming fluid may be selected from a wide variety of substances such as soybean oil or an inert gas such as nitrogen. Water may be used as the quench fluid. Other substances which may be used as the lumen forming fluid, the coating fluid and the quenching fluid include:

(a) paraffin oil
(b) peanut oil
(c) teel oil
(d) boleko oil
(e) oil of mustard
(f) olive oil
(g) seneca oil
(h) coconut oil
(i) coffee oil
(j) rapeseed oil
(k) corn oil
(l) cottonseed oil
(m) glycerol
(n) glyceryl trioleate
(o) trimyristin
(p) jojoba oil
(q) macassar oil
(r) neem oil
(s) castor oil
(t) orris root oil
(u) safflower oil
(v) oleic, palmitic, stearic, arachidic, arachidonic, behenic, lignoceric, linoleic, linolenic, elaidic, vaccenic acids and their glycerides, and mixed with their sodium, potassium and calcium salts
(w) dioctylphthalate and other phthalate esters of alcohols of six carbon atoms or more

EXAMPLE 2

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 31.3° C.

The dimensions of the fibre were 322 micron lumen diameter and 671 micron outside diameter.

The resulting fibre had a water permeability of 106 ml/min/m at 96 kPa, 367 ml/min/m at 398 kPa, and 478 ml/min/m at 599 kPa, a mean pore size of 0.301 micron and 90.7% pores above 0.16 micron.

EXAMPLE 3

5.2 kg Hoechst polypropylene PPN1060F was dissolved in 14.6 kg TERIC N2 with 0.2 kg antioxidant Ethanox 330 and extruded at a temperature of 230° C.

with soybean oil as the lumen, coating and quench fluids. The quench fluid temperature was 29.9° C.

The dimensions of the fibre were 324 micron lumen diameter and 652 micron outside diameter.

The resulting fibre had a water permeability of 126 ml/min/m at 96 kPa, 430 ml/min/m at 398 kPa, and 543 ml/min/m at 599 kPa, a mean pore size of 0.380 micron and 95.2% pores above 0.16 micron.

EXAMPLE 4

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 31.7° C.

The dimensions of the fibre were 323 micron lumen diameter and 640 micron outside diameter.

The resulting fibre had a water permeability of 94 ml/min/m at 95 kPa, 330 ml/min/m at 396 kPa, and 448 ml/min/m at 598 kPa, a mean pore size of 0.310 micron and 87.9% pores above 0.16 micron.

EXAMPLE 5

5.2 kg Hoechst polypropylene PPN1060F was dissolved in 14.6 kg TERIC N2 with 0.2 kg antioxidant Ethanox 330 and Extruded at a temperature of 230° C. with soybean oil as the lumen, coating and quench fluids. The quench fluid temperature was 31.8° C.

The dimensions of the fibre were 320 micron lumen diameter and 627 micron outside diameter.

The resulting fibre has a water permeability of 80 ml/min/m at 98 kPa, 288 ml/min/m at 399 kPa, and 393 ml/min/m at 600 kPa, a mean pore size of 0.260 micron and 80.9% pores above 0.16 micron.

EXAMPLE 6

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quency fluid temperature was 30.5° C.

The dimensions of the fibre were 325 micron lumen diameter and 642 micron outside diameter.

The resulting fibre had a water permeability of 73 ml/min/m at 98 kPa, 288 ml/min/m at 399 kPa, and 393 ml/min/m at 600 kPa, a mean pore size of 0.260 micron and 80.9% pores above 0.16 micron.

EXAMPLE 7

6.75 kg Hoechst polypropylene PPN1060F was dissolved in 18.25 kg TERIC N2 with 0.25 kg antioxidant Ethanox 330 and extruded at a temperature of 230° C. with soybean oil as the lumen, coating and quench fluids. The quench fluid temperature was 30.1° C.

The nominal dimensions of the fibre were 320 micron lumen diameter and 650 micron outside diameter.

The resulting fibre had a water permeability of 68 ml/min/m at 95 kPa, 288 ml/min/m at 402 kPa, and 347 ml/min/m at 600 kPa, a mean pore size of 0.270 micron and 80.1% pores above 0.16 micron.

EXAMPLE 8

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 31.5° C.

The dimensions of the fibre were 310 micron lumen diameter and 599 micron outside diameter.

the resulting fibre had a water permeability of 52 ml/min/m at 96 kPa, 241 ml/min/m at 397 kPa, and 305 ml/min/m at 598 kPa, a mean pore size of 0.322 micron and 65.7% pores above 0.16 micron.

EXAMPLE 9

5.2 kg Shell polypropylene LY6100 was dissolved in a mixture of 9.8 kg soybean oil and 4.6 kg castor oil with 0.2 kg antioxidant Ethanox 330 and extruded at a temperature of 195° C. with soybean oil as the lumen, coating and quench fluids. The quench fluid temperature was 26.2° C.

The nominal dimensions of the fibre were 320 micron lumen diameter and 650 micron outside diameter.

The resulting fibre had a bubble point of 175 kPa, a mean pore size of 0.3 micron and 87.4% pores above 0.16 micron.

EXAMPLE 10

5.2 kg Hoechst polypropylene PPR1070 was dissolved in a mixture of 9.8 kg soybean oil and 4.6 kg castor oil with 0.2 kg antioxidant Ethanox 330 and extruded at a temperature of 197° C. with soybean oil as the lumen, coating and quench fluids. The quench fluid temperature was 26.0° C.

The nominal dimensions of the fibre were 320 micron lumen diameter and 650 micron outside diameter.

The resulting fibre had a bubble point of 133 kPa, a mean pore size of 0.45 micron and 100.0% pores above 0.16 micron.

EXAMPLE 11

5.2 kg Hoechst polypropylene PPR1060F was dissolved in a mixture of 10.8 kg soybean oil and 5.0 kg castor oil and extruded at a temperature of 186° C. with soybean oil as the lumen, coating and quench fluids. The quench fluid temperature was 27.5° C.

The nominal dimensions of the fibre were 320 micron lumen diameter and 650 micron outside diameter.

The resulting fibre had a bubble point of 245 kPa, a mean pore size of 0.19 micron and 86.2% pores above 0.16 micron.

EXAMPLE 12

5.2 kg Hoechst polypropylene PPN1070 was dissolved in 14.6 kg TERIC N2 with 0.2 kg antioxidant Ethanox 330 and extruded at a temperature of 196° C. with soybean oil as the lumen, coating and quench fluids. The quench fluid temperature was 25.4° C.

The nominal dimensions of the fibre were 320 micron lumen diameter and 650 micron outside diameter.

The resulting fibre had a bubble point of 140 kPa, a mean pore size of 0.24 micron and 89.6% pores above 0.16 micron.

EXAMPLE 13

4.8 kg Hoechst polypropylene PPN1070 was dissolved in 15.0 kg TERIC N2 with 0.2 kg antioxidant Ethanox 330 and extruded at a temperature of 198° C. with soybean oil as the lumen, coating and quench fluids. The quench fluid temperature was 20.7° C.

The nominal dimensions of the fibre were 320 micron lumen diameter and 650 micron outside diameter.

The resulting fibre had a bubble point of 175 kPa, a mean pore size of 0.23 micron and 82.8% pores above 0.16 micron.

EXAMPLE 14

5.2 kg Hoechst polypropylene PPN1060F was dissolved in 14.6 kg TERIC N2 with 0.2 kg antioxidant Ethanox 330 and extruded at a temperature of 238° C. with soybean oil as the lumen, coating and quench fluids. The quench fluid temperature was 21.4° C.

The nominal dimensions of the fibre were 320 micron lumen diameter and 650 micron outside diameter.

The resulting fibre had a bubble point of 280 kPa, a mean pore size of 0.18 micron and 83.4% pores above 0.16 micron.

We claim:

1. An extrusion head for forming a polymeric hollow fiber comprising:
   an elongated body defining an axial passageway for receiving and expressing a lumen-forming fluid,
   a first annular passageway for receiving and expressing a polymeric fiber-forming fluid, from which a polymeric hollow fiber is formed, coaxially with said lumen-forming fluid, a second annular passageway radially outward of said first annular passageway, said second annular passageway for receiving and expressing a coating fluid coaxially with and contiguous to said fiber forming fluid, and
   a third annular passageway radially outward of said second annular passageway for receiving and expressing a quenching fluid coaxially with said coating fluid, and means for directing flow of said quenching fluid toward the outer surface of said coating fluid.

2. An extrusion head according to claim 1 wherein the axial passageway, the first annular passageway and the second annular passageway are located in a first portion of the extrusion head and the third annular passageway is located in a second portion of the extrusion head.

3. An extrusion head according to claim 2 wherein the extrusion head has a passageway connecting the first and second portions and the third annular passageway is radially outward of the connecting passageway with the directing means therebetween.

4. An extrusion head according to claim 1 wherein the axial passageway terminates in a nozzle that projects into the first annular passageway.

5. An extrusion head according to claim 4 wherein the nozzle has a plurality of protrusions around its outer periphery for centering the nozzle with respect to the first annular passageway.

6. An extrusion head according to claim 1 wherein the first annular passageway is inwardly tapered towards the axis of the extrusion head.

7. An extrusion head according to claim 6 wherein the first passageway has a first tapered portion and a second tapered portion with the first tapered portion being at a greater angle to the axis than the second tapered portion.

8. An extrusion head according to claim 1 wherein the axial passageway and the first annular passageway terminate at the same position within the extrusion head.

9. The extrusion head of claim 1 wherein the second annular passageway has a first portion of constant cross-section and a second portion that is tapered towards the axis of the axial passageway.

10. An extrusion head according to claim 3 wherein the directing means comprises an elongated annular member having a tapered bore, the taper increasing outwardly relative to the direction of fibre flow through the extrusion head.

11. A hollow fibre forming installation comprising:
   (i) a vessel for containing a polymeric fiber forming fluid from which the polymeric hollow fibre is formed,
   (ii) at least one extrusion head according to claim 1,
   (iii) means for transporting the polymeric fiber forming fluid to the extrusion head,
   (iv) means for supplying lumen-forming fluid to the extrusion head,
   (v) means for supplying coating fluid to the extrusion head,
   (vi) means for supplying cooling liquid to the extrusion head, and,
   (vii) means for heating the polymeric fiber forming fluid, the lumen-forming fluid and the coating fluid to substantially the same temperature.

12. An installation according to claim 11 and including a filter between the vessel and the extrusion head.

13. An installation according to claim 11 and including four extrusion heads.

* * * * *